United States Patent [19]  [11] Patent Number: 4,704,098
Tsubakimoto  [45] Date of Patent: Nov. 3, 1987

[54] COMBINATION CHAIN LINK

[75] Inventor: Yasumasa Tsubakimoto, Osaka, Japan

[73] Assignee: Tsubakimoto Chain Company, Osaka, Japan

[21] Appl. No.: 883,106

[22] Filed: Jul. 8, 1986

Related U.S. Application Data

[63] Continuation-in-part of Ser. No. 750,686, Jun. 28, 1985, abandoned.

[30] Foreign Application Priority Data

Jul. 30, 1984 [JP] Japan ............................ 59-115070[U]

[51] Int. Cl.⁴ .............................................. F16G 13/06
[52] U.S. Cl. ..................................... 474/206; 474/226
[58] Field of Search ................ 474/206, 212, 216, 226, 474/228, 232

[56] References Cited

U.S. PATENT DOCUMENTS 1,469,001  9/1923  Gentry .............................. 474/228 X
2,517,497  8/1950  Lauenstein ........................ 474/206 X

FOREIGN PATENT DOCUMENTS 483170  4/1938  United Kingdom ................ 474/226

Primary Examiner—Stephen J. Novosad
Assistant Examiner—Thuy M. Bui
Attorney, Agent, or Firm—Dann, Dorfman, Herrell & Skillman

[57] ABSTRACT

A link chain comprising a series of inner links, outer links and means connecting said inner and outer links for pivotal displacement about a series of transverse axes. The inner links are integral plastic structures of self-lubricating wear-resistant material, including a pair of side plates, a pair of bushing means extending between said plates and concentric with said transverse axes, and an outwardly projecting part at the side margin of each of the side plates extending along the central part of said side plates between the end edges of said adjacent outer links. The end edges of the metallic outer links and the projecting parts of the plastic structure are in the form of an arc of a circle concentric with the adjacent transverse axis. The thickness of the projecting part corresponds to the thickness of said outer links to form a substantially continuous sliding contact area along each side of the link chain. The projecting part may be in the form of a strip along each side edge of each side plate, or may extend across the width of each side plate from side edge to side edge between the adjacent outer links. The length of said projecting part along the side margin of each side plate is greater than the spacing between the bushing means.

7 Claims, 6 Drawing Figures

COMBINATION CHAIN LINK

This application is a continuation-in-part application of U.S. application Ser. No. 750,686 filed June 28, 1985, now abandoned.

FIELD OF THE INVENTION

The present invention relates to a structure for a combination link chain wherein an inner link and bushings of a chain link are integrally molded by means of a plastic material.

DESCRIPTION OF THE PRIOR ART

Combination liks devised heretofore have the following disadvantages. The breaking strength of the central region with respect to the chain tension is unfavorably low because of the inner link has a flat plate shape. Further, the prior art combination chain links easily become worn since the sliding contact area is unfavorably small in relation to the chain guide rail.

SUMMARY OF THE INVENTION

Accordingly, it is a primary object of the present invention to provide a combination chain link which has increased breaking strength and wear-resistant properties in relation to the chain guide rail.

To this end, the invention provides a combination chain link comprising: an integral plastic structure consisting of an inner link, a bushing for forming a chain, and an outwardly projecting part integrally formed at each of the side edge regions of the outer surfaces of the structure in such a manner that the outwardly projecting part is flush with the outer surface of an adjacent outer link which is provided to interconnect the inner links in a series, the outwardly projecting part having such a shape that it does not interfere with the outer link when the latter is pivotally displaced.

By virtue of the above-described arrangement, the provision of the outwardly projecting part advantageously makes it possible to increase the breaking strength of the structure with respect to the chain tension and at the same time to increase the sliding contact area, thereby improving the wear-resistant properties.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
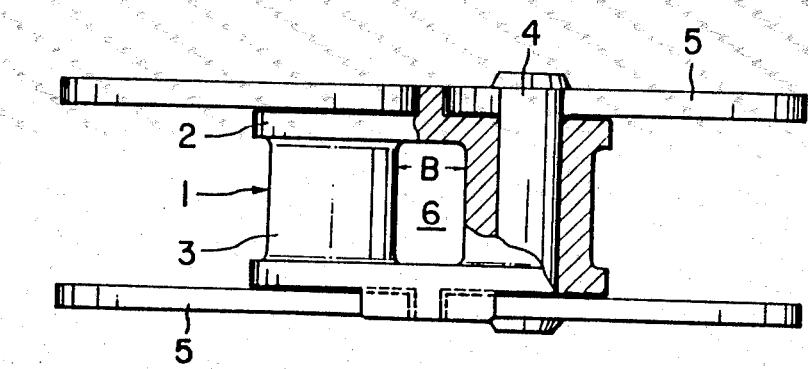
FIG. 1 is a partly-sectioned view of one embodiment of the present invention.
Figure 2:
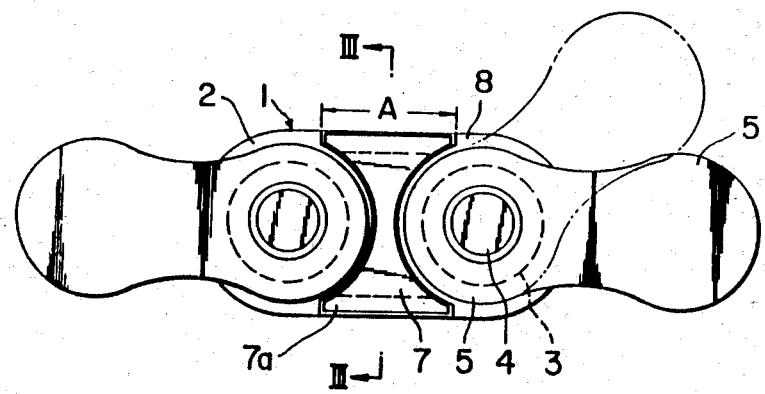
FIG. 2 is a side elevational view of the embodiment shown in FIG. 1.
Figure 3:
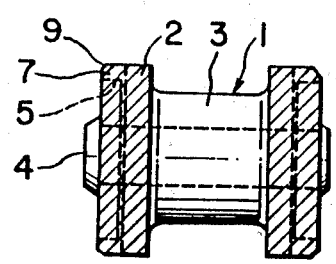
FIG. 3 is a sectional view taken substantially along the line III—III of FIG. 2.

Referring first to FIGS. 1 to 3, a combination chain link 1 has a pair of inner link side plate parts 2 and bushing parts 3, which span between the side plates and respectively define front and rear and transverse axes for pivotally connecting outer links 5 joined thereto. The inner link parts 2 and the bushing parts 3 are integrally molded of a self-lubricating plastic which is highly wear-resistant. The portions 2 and 3 of the inner chain link 1 are connected to a pair of adjacent outer links 5 by means of pins 4 extending through the bushing parts 3. The plates 5 are punched or stamped from metallic flat sheet material preferably steel plate of uniform thickness throughout. The structure 1 has a recess 6 engageable with the drive teeth of a driving sprocket (not shown) and which is formed between the front and rear bushing parts 3.

Figure 6:
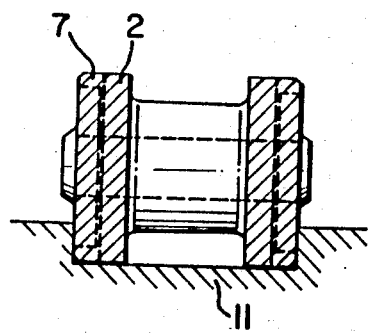
FIG. 6 is a cross-sectional view of the first embodiment showing its engagement with a chain guide rail.

In accordance with the invention, an outwardly projecting part 7, whose outer surface is substantially flush with the outer surface of the adjacent outer links 5, is integrally molded with the inner link plates 2 such as to extend across its whole width at the central longitudinal region of each of the outer surfaces of the structure 1. Since the end edge of each of the outer links 5 forms an arc of circular shape concentric with the transverse axis of the adjacent pin 4, the outwardly projecting part 7 has a concave circular shape at each end which is concave and concentric with the end edge of the outer link 5 such as not to interfere with the outer link 5 when it is pivotally displaced on the pin 4. The thickness of the part 7 beyond the inner link plate 2 is equal to the thickness of the metal links 5, so that their outwardly-facing surfaces are substantially coplanar, as shown in FIGS. 3 and 6. Along each of the side margins 8 of the inner link portion 2, the outwardly projecting part 7 has a longitudinal length A (FIG. 2) which well exceeds the longitudinal width B of the recess 6 (FIG. 1). Thus, the outwardly projecting part 7 has a general profile which has a cross sectional shape similar to that of a biconcave lens. Therefore, the longitudinal central region along the side margin 8 has a substantially doubled wall thickness by virtue of the outwardly projecting portion 7. Hence its breaking strength is doubled. Additionally, a chamfered portion 9 is formed along the outer perimeter of the outwardly projecting portion 7.

Figure 4:
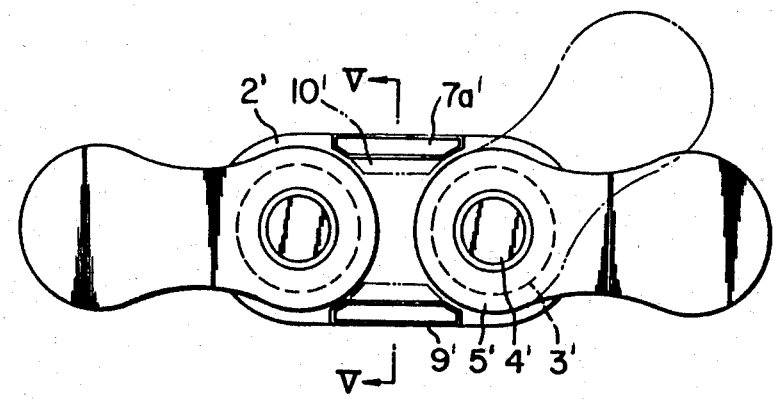
FIG. 4 is a side elevational view of another embodiment of the present invention.
Figure 5:
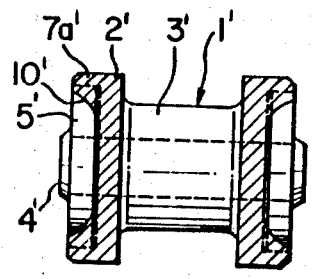
FIG. 5 is a sectional view taken generally along the line V—V of FIG. 4.

FIGS. 4 and 5 in combination show another embodiment. In the embodiment shown in FIG. 2, the effect of the doubled breaking strength is substantially created by the marginal parts 7a of the outwardly projecting part, which parts are in proximity to the side margins 8 of the inner link 2. In FIGS. 4 and 5 parts corresponding to those of FIGS. 1-3 are identified with the same reference character with a prime ('). According to the embodiment shown in FIG. 4 in comparison to the embodiments shown in FIG. 2, all other parts excluding a strip 7a' along the edge of the side margin 8' and a fillet 10' on its inner side are therefore removed, whereby it is possible to reduce the amount of required materials without essentially decreasing the breaking strength.

FIG. 6 shows a chain to which the present invention is applied in a state wherein the chain slides in a track on a guide rail 11. As illustrated in FIG. 6, sliding contact is made between the guide rail 11 and the inner link part 2 whose thickness is doubled by virtue of the outwardly projecting part 7 or 7a, thereby increasing its sliding area (it shows an increase of approximately 1.7 times according to this embodiment). The thus increased sliding area improves the wear-resistant properties correspondingly. The chamfer 9 assists in the engagement of the chain assembly into the track of the rail 11. The pins 4 of the chain are ferrous material which has a head formed to bear against the steel plate 5. Preferably the bushing portion of the plastic structure 1 freely rotates on the shank of the pin by reason of its self-lubricating character, so as to minimize movement where the metal pin engages the metal plate. As shown in FIG. 6, the heads of the pins 4 are small enough to avoid interference with the travel of the chain within the track of the rail 11.

The present invention has the above-described arrangement, which advantageously makes it possible to increase the breaking strength in relation to the chain tension and improve the wear-resistant properties with respect to the sliding motion on the guide rail. Moreover, the outwardly projecting portion 7 shown in the embodiment of FIG. 2 is flush with the outer link 5 and therefore decreases the irregularities on the outer surface of the chain, and forms a substantially continuous sliding contact area along each side of the chain along both the upper and lower edges thereof. It should be noted that when the links are pivotally displaced on the axes of the pins 4, the clearance between the complementary arcuate end edges of the outer link and of the projecting parts remains substantially constant, avoiding any pinching action which might otherwise cause the chain to pick up and retain foreign matters. Hence, the amount of dust or other foreign matter adhering to the recessed regions of the link chain is reduced, and the chains of the present invention may suitably be employed in a food apparatus where sanitary conditions are a critical factor.

The combination of the metallic, preferably steel, outer plates with the inner plate structure of self-lubricating wear-resistant plastic provides an improved performance by minimizing wear in the chain and the track without sacrificing the structural integrity and resistance to deformation which is provided by the steel plates. Not only does this combination provide improved performance, it reduces noise in operation and reduces the overall weight of the chain.

I claim:

1. A link chain comprising a series of inner links, outer links and means connecting said inner and outer links for pivotal displacement about a series of transverse axes, each inner link comprising an integral structure of self-lubricating wear-resistant plastic including a pair of side plates and a pair of bushing means extending between said plates and concentric with said transverse axes, said side plates having outer surfaces facing said outer links, adjacent outer links in said series comprising metallic plates having end edges spaced apart to afford said pivotal displacement, each of said pair of side plates of the inner links between said adjacent outer links having an outwardly projecting part integrally formed of said self-lubricating wear-resistant plastic on a side margin at least, of each of the outer surfaces of the side plates of said inner link, said outwardly projecting part providing a smooth sliding engagement with a track of a guide rail without excessive wear in the track and extending along said side plates between the end edges of said adjacent outer links and having a shape such that said outwardly projecting part does not interfere with said outer links when said outer links are pivotally displaced.

2. A link chain according to claim 1 wherein said bushing means have axial bores concentric with said transverse axes, and said connecting means includes metallic pin means extending through said bores, with end portions bearing against the metallic outer links and affording said pivotal displacement of said outer links relative to said inner link.

3. A link chain according to claim 1 wherein the end edges of outer links are in the form of an arc of a circle concentric with the adjacent tranverse axis, said projecting part extending along the side margin of the side plate and terminating at each end closely adjacent the end edge of the adjacent outer link, the thickness of said projecting part corresponding to the thickness of said outer links whereby said outer plates combine with said projecting parts of the series of inner links to form a substantially continuous sliding contact area along at least one side of the link chain, alternating between the metallic surfaces of said outer links and the plastic surfaces of said projecting parts.

4. A link chain according to claim 3 wherein the said projecting parts have chamfered perimeters to afford easy engagement of said chain in a track of a guide rail.

5. A link chain according to claim 3 wherein said projecting part comprises a strip along each side edge of each side plate.

6. A link chain according to claim 3 wherein said outwardly projecting part extends across each side plate from side edge to side edge, and the end edges of said part are in the form of a concave arc of a circle concentric with the adjacent transverse axis, said end edges of the projecting part having a uniform clearance relative to end edges of the adjacent outer links to afford said pivotal displacement of said inner and outer links on the said transverse axes without substantially changing the amount of clearance space between said outer links and said parts.

7. A link chain according to claim 1 wherein said bushing means comprise cylindrical parts extending between the side plates and being spaced apart to accommodate the teeth of a drive sprocket therebetween, the spacing between said cylindrical parts being less than the length of said projecting part along the side margin of each side plate.

* * * * *